(12) United States Patent
Kandasamy et al.

(10) Patent No.: US 9,218,343 B2
(45) Date of Patent: *Dec. 22, 2015

(54) PARTITION FILE SYSTEM FOR VIRTUAL MACHINE MEMORY MANAGEMENT

(75) Inventors: Madhusudanan Kandasamy, TamilNadu (IN); Ramblias Varma, New Dehli (IN); Balaji Viswanathan, Bangalore (IN); Koustuv Dasgupta, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 12/973,411

(22) Filed: Dec. 20, 2010

(65) Prior Publication Data

US 2012/0158803 A1 Jun. 21, 2012

(51) Int. Cl.
*G06F 17/30* (2006.01)
*G06F 11/14* (2006.01)
*G06F 9/50* (2006.01)

(52) U.S. Cl.
CPC .............. *G06F 17/30* (2013.01); *G06F 9/5077* (2013.01); *G06F 11/1453* (2013.01); *G06F 17/3015* (2013.01)

(58) Field of Classification Search
None
See application file for complete search history.

(56) References Cited

U.S. PATENT DOCUMENTS

| | | | |
|---|---|---|---|
| 7,584,228 B1 | 9/2009 | Protassov | |
| 8,209,506 B2 * | 6/2012 | Yueh | 711/162 |
| 8,983,952 B1 * | 3/2015 | Zhang et al. | 707/736 |
| 2003/0105927 A1 * | 6/2003 | Aoki | 711/132 |
| 2006/0212481 A1 * | 9/2006 | Stacey et al. | 707/104.1 |
| 2008/0120292 A1 * | 5/2008 | Sundaresan et al. | 707/5 |
| 2009/0177855 A1 * | 7/2009 | Drews et al. | 711/162 |
| 2010/0121825 A1 * | 5/2010 | Bates et al. | 707/692 |
| 2011/0184921 A1 * | 7/2011 | Reiter et al. | 707/692 |
| 2012/0137059 A1 * | 5/2012 | Yang et al. | 711/104 |

FOREIGN PATENT DOCUMENTS

DE EP01300757 A1 4/2003

OTHER PUBLICATIONS

Biggar—"Experiencing Data De-Deuplication: Improving Efficiency and Reducing Capacity Requirements", The Enterprise Strategy Group, Inc. (Feb. 2007).

(Continued)

*Primary Examiner* — Miranda Huang
(74) *Attorney, Agent, or Firm* — Parashos Kalaitzis; Mark P Kahler (57) ABSTRACT

A virtual machine of an information handling system (IHS) initializes an operating system to provide partition file system memory management during application execution. The operating system employs multiple partitions that include one or more applications for execution within the virtual machine. A file system tool identifies write operations to a global file system and generates local and common file system information. The file system tool populates the local file systems that include delta local file systems and differential file systems with write operation data. The file system tool may generate stackable common delta file system information to store write operation data common to two or more partitions that employ executing applications. The file system tool may combine or separate stackable common delta file system information to provide improvements in virtual machine memory utilization.

14 Claims, 5 Drawing Sheets

(56) References Cited

OTHER PUBLICATIONS

IBM—"Method for Secure Sharing of Attributes across Software Partitions"—IBM Source: IP.com, IPCOM000175735D (Oct. 22, 2008).

Monteiro—"Corral: Stackable Copy-on-Write Versioning Device using Linux Device-Mapper" Mascotte Project—CNRS/I3S/INRIA, USENIX 2008 Conference (Jun. 2008).

* cited by examiner

FIG. 1

FIG. 2
VIRTUAL MACHINE WITH PARTITION FILE SYSTEM

FIG. 4
PARTITION SHARED FILE SYSTEM METHOD AND TOOL (GENERATE AND POPULATE DELTA LOCAL FILE SYSTEMS AND COMMON DELTA FILE SYSTEMS)

FIG. 5

PARTITION SHARED FILE SYSTEM METHOD AND TOOL (GENERATE AND POPULATE STACKABLE COMMON DELTA FILE SYSTEMS)

PARTITION FILE SYSTEM FOR VIRTUAL MACHINE MEMORY MANAGEMENT

BACKGROUND

The disclosures herein relate generally to information handling systems (IHSs), and more specifically, to the management of shared application information between virtual machine partitions of an IHS.

Information handling systems (IHSs) typically employ operating systems that may execute applications or other processes that require the resources of processors or processor cores. IHSs may employ virtual machine (VM) technology such as that which the Java Development Kit (JDK) or Java Runtime Environment (JRE) virtual machines (VMs) provide. (Java is a trademark of the Oracle Corp.) A Java virtual machine (JVM) or other virtual machine may provide application execution capability during development, debugging, or real time program operations. The virtual machine may employ an operating system (OS) that includes include multiple partitions for execution of one or more applications within the IHS. The virtual machine may organize the partitions within the OS to provide separate application memory and other IHS resource separation and also provide joint or shared information sources, such as shared file system information.

The operating system OS of an IHS may employ partition file system management software or tools for use in partition file system shared information management. In particular, a partition file system tool may provide memory resource management during application execution within one or more partitions of the virtual machine. Effective partition file system software may significantly improve application execution efficiencies as well as effective memory resource utilization in an IHS.

BRIEF SUMMARY

In another embodiment, an information handling system (IHS) is disclosed. The IHS includes a processor and a memory coupled to the processor. The memory is configured to load an operating system, the operating system including first and second partitions, the first and second partitions including first and second applications, respectively, the operating system including a global file system. The first application initiates a first write operation to the global file system. The operating system intercepts the first write operation to the global file system, thus providing a first intercepted write operation that includes first intercepted write data. The operating system generates a first delta local file system (DLFS) in the first partition to store the first intercepted write data. The memory includes a file system tool that is configured to test and determine if the first intercepted write data is common between the first delta local file system (DLFS) in the first partition and a second delta local file system (DLFS) in the second partition, thus providing first common intercepted write data. The file system tool is also configured to generate a first common delta file system (CDFS) that stores the first common intercepted write data that is common to the first and second partitions. The file system tool is further configured to remove from the first delta local file system the first common intercepted write data.

In yet another embodiment, a computer program product is disclosed. The computer program product includes a computer readable storage medium for use on an information handling system (IHS). The computer program product also includes first instructions that load an operating system into a system memory, the operating system including first and second partitions, the first and second partitions including first and second applications, respectively, the operating system including a global file system. The computer program product further includes second instructions that instruct the first application to initiate a first write operation to the global file system. The computer program product still further includes third instructions that instruct the operating system to intercept the first write operation to the global file system, thus providing a first intercepted write operation that includes first intercepted write data. The computer program product also includes fourth instruction that instruct the operating system to generate a first delta local file system (DLFS) in the first partition to store the first intercepted write data. The computer program product includes a file system tool that includes fifth instruction that test to determine if the first intercepted write data is common between the first delta local file system (DLFS) in the first partition and a second delta local file system (DLFS) in the second partition, thus providing first common intercepted write data. The file system tool includes sixth instructions that generate a first common delta file system (CDFS) that stores the first common intercepted write data that is common to the first and second partitions. The file system tool also includes seventh instructions that remove from the first delta local file system (DLFS) the first common intercepted write data. The first, second, third, fourth, fifth, sixth and seventh instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Information handling systems (IHSs) typically employ operating systems (OSs) that execute applications or other processes within the IHS. The IHS may include multiple processors, such as processor cores, or other processor elements for application execution and other tasks. The IHS may execute applications or processes within a virtual environment, such as a Java virtual machine (JVM) environment. The JVM or virtual machine (VM) operating system resides within memory resources of the IHS, such as within hypervisor memory resources. The VM may include file system software for management of application file information during application execution.

The OS or VM may employ virtual file system memory allocation or dynamic file system memory allocation during application execution. Virtual machine memory is useful within the limited memory resources of an IHS during application execution that employs one or more partitions of the OS. File system stores may provide local information for a particular partition and the application executing in that particular partition. In other cases, the file system may provide shared or joint global information that executing applications of different partitions share.

File systems provide for storing and organizing application data during execution of the application within the IHS. A file system may organize application data into private or local file stores. In this manner, the local file store or local file system provides application information for a particular partition of the OS. In other words, the local file system supports applications within a particular partition and does not provide shared file system information for applications that may execute within other partitions of the OS. Local file systems employ the memory resources of the IHS to organize and service file system resource needs of locally executing applications.

An operating system may employ a global file system to manage shared information resources between two or more partitions of the OS. For example, applications within a particular partition of the OS may share information with another application within another partition of the OS. In this manner, the OS may reduce the amount of memory that multiple partitions require during execution of applications that share memory resources. The OS may store OS image information within the global file system and share that OS image information among all multiple partitions of the OS.

An IHS may employ memory, such as system memory that may include a hypervisor or virtual machine monitor (VMM). The hypervisor provides a virtualization method to generate one or more operating systems OSs within a virtual machine VM. The hypervisor may provide an OS or virtual OS platform that monitors the execution of programs or applications within a particular partition.

The hypervisor may include one or more VMs that operate concurrently. The VM may include an OS or OS image. The VM may include multiple OSs or multiple OS images or instances that may operate concurrently. An OS image may include kernel data, file system information, libraries, and programs of an IHS at a particular point in time during execution of one or more applications. OS images may provide for rapid installation of OSs into VM memory for specific or particular application task execution. The OSs may share IHS resources, such as memory and the virtualized hardware resources within the VM.

A particular OS, such as a Microsoft Windows 7 operating system includes software program and data information. (Windows is a trademark of the Microsoft Corp.) In a virtualized environment, such as a cloud, the OS executes within the VM and acts as an intermediary between applications or programs, users, and the IHS hardware. A cloud is a construct of a virtualized environment within memory or other resources of an IHS. In one embodiment, the cloud may employ real or virtual hardware resources to provide interconnecting structure between resources of one IHS and the resources of another IHS. In one case, a cloud infrastructure is a network, such as an Internet network, that connects multiple IHSs for purposes of data communication and manipulation.

A virtual operating system may include one or more partitions. Each partition may represent an instance or use of a particular OS. For example one partition may correspond to a particular user, wherein another partition corresponds to another user. In other embodiments, each partition of the OS may correspond to a logical portioning or division of IHS resources either virtual or real. An IHS typically generates partitions to provide performance improvements particularly in the management of memory resources during application execution.

During OS operation within an IHS, each partition of the OS may require shared information. One example of shared information is a global file system (GFS). A GFS may provide common data resources to multiple partitions and multiple applications within an OS. A file system is a method of storing and organizing files and their data for use by resources of the OS. In one embodiment, file systems may store information within the virtual memory resources of the IHS, such as system memory. In another embodiment, file systems may store information within non-virtual memory resources of the IHS, such as non-volatile storage or other memory resources. A remote GFS may provide application file information access for IHS resources to other IHSs, such as those in a remote cloud location. In this manner, remote GFSs may employ a virtual or redirecting file source.

The disclosed file system tool generates and manages data file systems within IHS memory. Data file systems may include information that is common between multiple partitions of the IHS. For example, during application execution the file system tool may populate a global file system (GFS) with information common to all partitions of the IHS. With the GFS in local memory, IHS partitions experience improvements in data read times for common information. The file system tool may also generate and manage multiple common file systems that provide common information between two or more partitions. The file system tool may stack or otherwise organize multiple common file systems within IHS memory. For improvements in memory utilization and speed of information reads, the disclosed files system tool may employ data files systems that include differences between two or more files systems.

Figure 1:
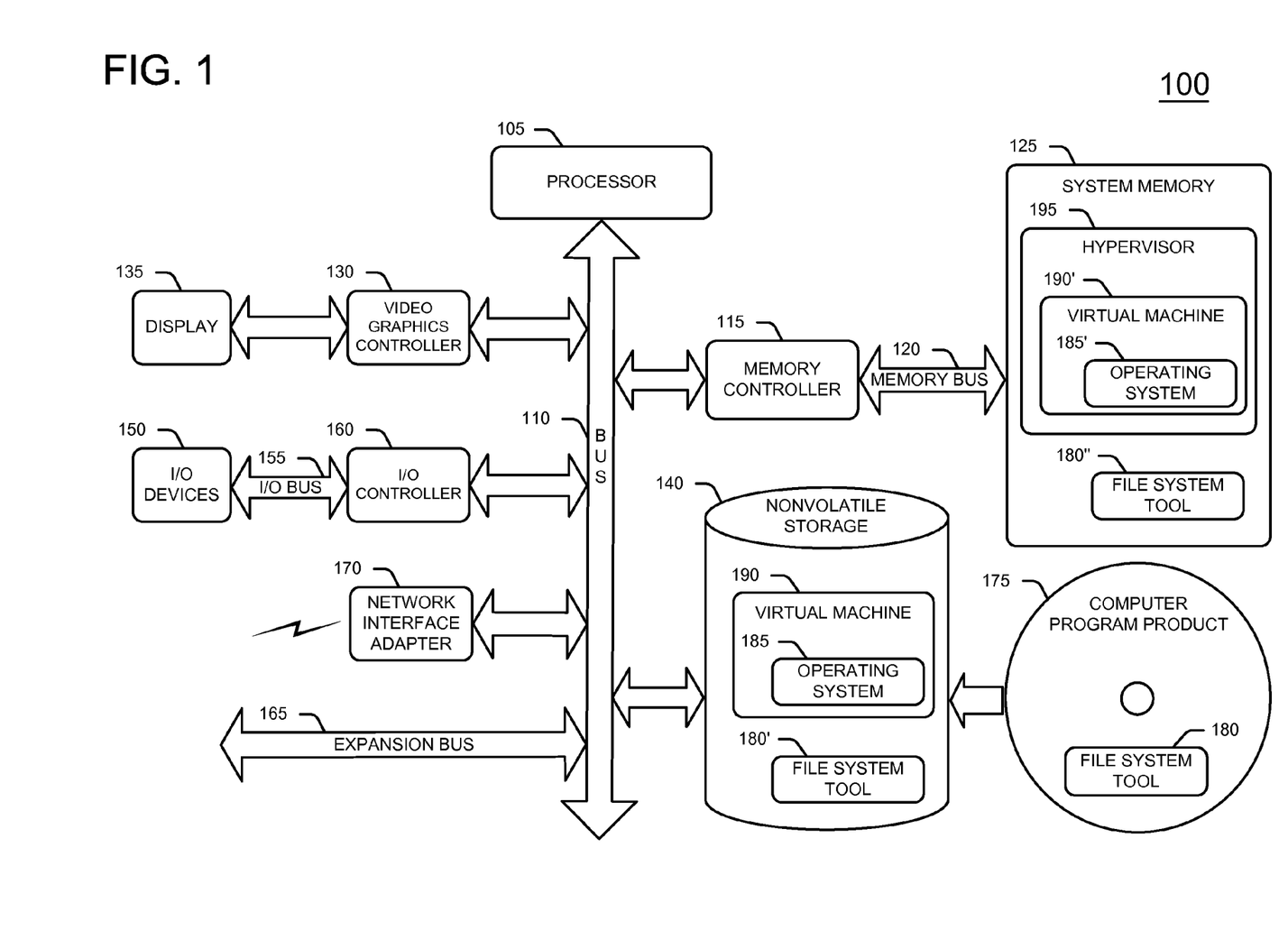
FIG. 1 shows a block diagram of a representative information handling system (IHS) that employs the disclosed partition file system management methodology.

FIG. 1 shows an information handling system (IHS) 100 with a file system tool 180 and a virtual machine 190 that employs the disclosed partition file system management methodology. In one embodiment, virtual machine 190 may include operating system 185 and execute within a hypervisor 195 as virtual machine 190'. VM 190 is described in more detail below. IHS 100 includes a processor 105. In one embodiment, processor 105 may include multiple processors cores (not shown). IHS 100 processes, transfers, communicates, modifies, stores or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array.

Processor 105 may also include local memory (not shown) such as L1 and L2 caches (not shown). A video graphics controller 130 couples a display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, eSATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. In this embodiment, network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, netbook, tablet or other form factor computer or data processing system. IHS 100 may take other form factors such as a gaming device, a personal digital assistant (PDA), a portable telephone device, a communication device or other devices that include a processor and memory.

IHS 100 may store information on nonvolatile storage 140. IHS 100 includes a computer program product on digital media 175 such as a CD, DVD or other media. In one embodiment, a designer or other entity configures the computer program product with file system tool 180 to practice the disclosed partition file system management methodology. In practice, IHS 100 may store file system tool 180 on nonvolatile storage 140 as file system tool 180'. Nonvolatile storage 140 may store VM 190 and file system tool 180'. VM 190 may include OS 185.

When IHS 100 initializes, the IHS loads VM 190 and OS 185 into system memory 125 for execution within hypervisor 195 as VM 190' and OS 185', respectively. In one embodiment, system memory 125 includes file system tool 180" outside of hypervisor 195. In other embodiments, system memory 125 may include file system tool 180" within OS 185', within VM 190', or within hypervisor 195. VM 190' may employ file system tool 180" to manage file systems within IHS 100 memory resources or within virtual machine 190'.

In accordance with the disclosed methodology, file system tool 180 may employ VM 190 along with OS 185, and other memory management resources to manage file system information between partitions of VM 190. In one embodiment, IHS 100 may employ VM 190 as a virtual machine (VM) of a virtual machine environment. For example, IHS 100 may employ Java JDK or Java JRE to enable VM technology. Other embodiments may employ other virtual machine environments depending on the particular application or need.

Figure 2:
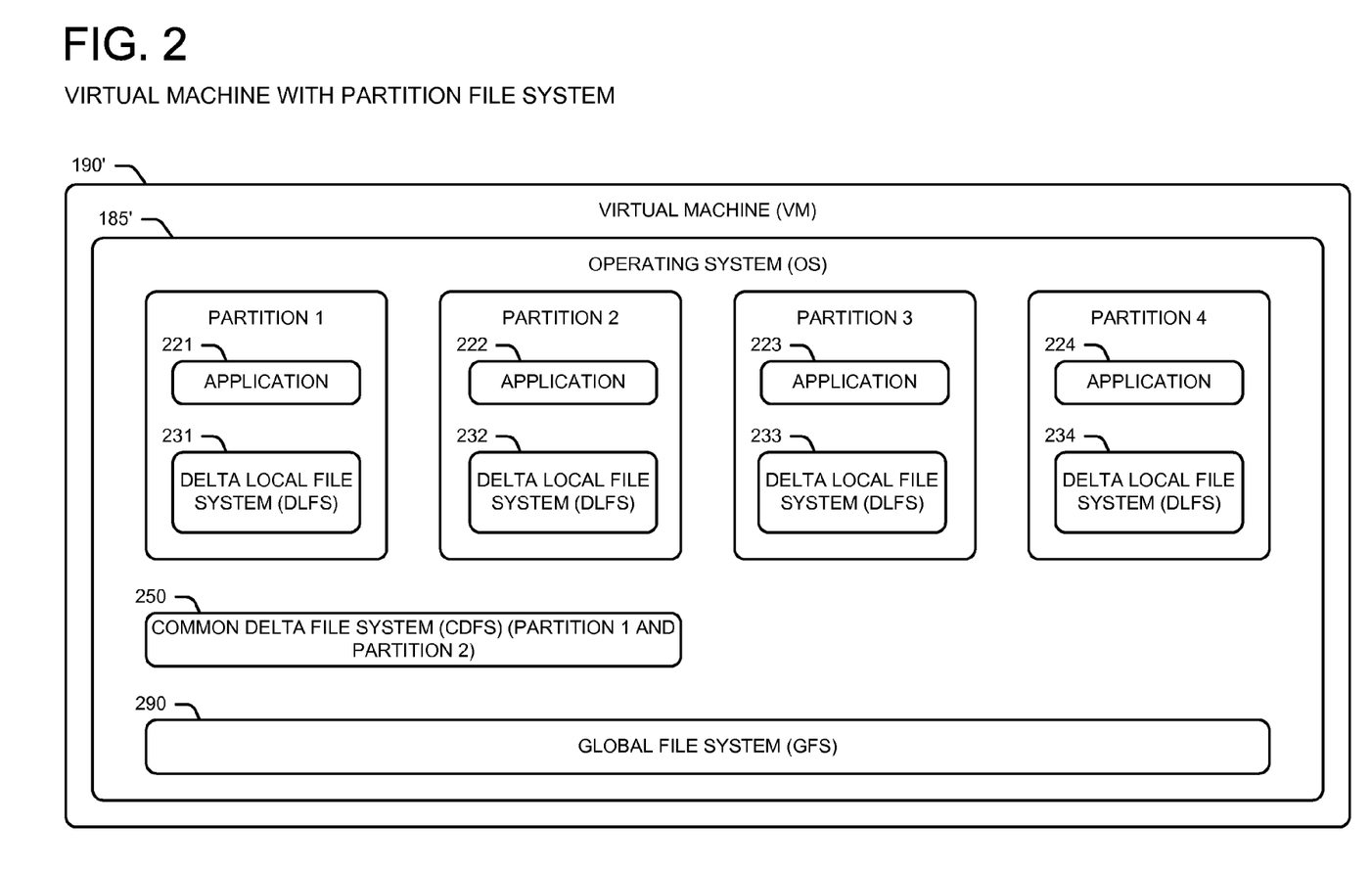
FIG. 2 shows a virtual machine with multiple partitions within an IHS that employs the disclosed partition file system management methodology.

FIG. 2 is a block diagram of one embodiment of virtual machine 190' that file system tool 180" populates with partition file system information during application execution, as described in more detail below. In one embodiment, VM 190' may include OS 185' that includes a partition 1, partition 2, partition 3, and a partition 4. In other embodiments, OS 185' may include other partition counts. Partition 1 includes an application 221 for execution within VM 190'. Partition 1 includes a delta local file system (DLFS) 231. A delta local file system includes information that is unique to a particular partition in which it resides and not information that is part of any other file system within OS 185'. DLFS 231 thus stores that information that only partition 1 stores and that is not stored by any other file system in OS 185'. In other words, DLFS 231 stores that local unique information that represents the difference between information that all the file systems in OS 185' store and that information that is common among those file systems.

Partition 1 may employ DLFS 231 to store information that application 221 requires during execution. In this case, the information in DLFS 231 is private or local to partition 1. In other words, VM 190' does not share DLFS 231 information with other applications outside of partition 1. Partition 2 includes an application 222 and a DLFS 232 that stores application 222 information. In a similar manner, partition 3 includes an application 223 and a DLFS 233 that stores application 223 information. Partition 4 includes an application 224 and a DLFS 234 that stores application 224 information. OS 185' includes a common delta file system (CDFS) 250 that may include common information shared between partition 1 and partition 2. OS 185' may also include a global file system (GFS) 290 that includes common or shared information that is shared by all partitions of OS 185', namely partition 1, partition 2, partition 3, and partition 4.

In one embodiment (not shown), VM 190' may include local file systems for each partition and a global file system, such as GFS 290, for information shared between all partitions of OS 185'. In that case, each partition may include copies of GFS 290 information with only minor changes. This may require substantial memory utilization when multiple partitions and multiple applications are operating.

In another embodiment of the disclosed partition file system management method, as shown in FIG. 2, VM 190' employs GFS 290 to maintain common information that all partitions of OS 185' share. OS 185' also includes one or more common delta file systems (CDFSs), such as CDFS 250 to maintain common information, namely information that is common between two or more partitions. For example, CDFS 250 maintains common information that is common between partition 1 and partition 2 collectively. CDFS 250 may include information that is in addition to or unique to the information that GFS 290 maintains.

As shown in FIG. 2, each particular partition includes a delta local file system (DLFS). As described above, a delta local file system includes only that information that is unique to the particular partition in which the DLFS resides and not information that is part of any other file system within OS 185'.

For example, GFS 290 may include a telephone directory for a corporation or other entity. Application 221 and application 222 may each access GFS 290 information and attempt to update a particular entry of the telephone directory information. In this example, both application 221 and application 222 may wish to add a common and yet uniquely new entry to the telephone directory of GFS 290. VM 190' may maintain GFS 290 as a read only memory source and intercept any memory writes to GFS 290. As application 221 and application 222 each attempt to write the new telephone directory entry to GFS 290, OS 185' may employ file system management resources, such as the disclosed file system tool 180" to generate and form CDFS 250.

Instead of maintaining a full copy of GFS 290 within each of partition 1 and partition 2, file system tool 180" determines that CDFS 250 may maintain only the new telephone directory entry. CDFS 250 may be significantly smaller in memory size than GFS 290. In this manner, memory resources benefit greatly by a reduction in total memory use in the case of GFS 290 modification. Since partition 3 and partition 4 do not require the changes to GFS 290, CDFS 250 does not support those partitions, namely partition 3 and partition 4. In other words, CDFS 250 provides file system information for partition 1 and partition 2, but not for partitions 3 and 4 in this embodiment. More particularly, CDFS 250 provides file system information to the applications that execute within partition 1 and partition 2.

Continuing with the present example, application 221 and application 222 may desire to add unique or different information to CDFS 250. File system tool 180" may determine that generating unique delta file system information for both partition 1 and partition 2 is a better memory resource option than modifying or creating additional common delta file systems, such as CDFS 250. In this case, file system tool 180" may generate and populate delta local file systems, namely DLFS 231 and DLFS 232, with unique partition specific information. File system tool 180" may maintain the total file system integrity by including or removing DLFS, CDFS, and GFS information from the file system stores of OS 185' during execution of the applications of partition 1, partition 2, partition 3, and partition 4.

As stated above, GFS 290 may be a read only database or memory resource. A trigger for file system tool 180" operation may be any attempt to write information from application 221, application 222, application 223, or application 224 to GFS 290. In one embodiment, file system tool 180" intercepts write operations from any particular application of OS 185', such as application 221, to GFS 290 and determines the most efficient implementation of delta local file system (DLFS) or common delta file system (CDFS) generation and population with the intercepted write operation data. In this manner, VM 190' may benefit from a total reduction of GFS 290 memory copies within other file systems of OS 185'. In other words, OS 185' need not create full copies of an updated or modified GFS 290 within each of partitions 1-4 when an executing application of one of those partitions performs a write operation to GFS 290.

Figure 3:
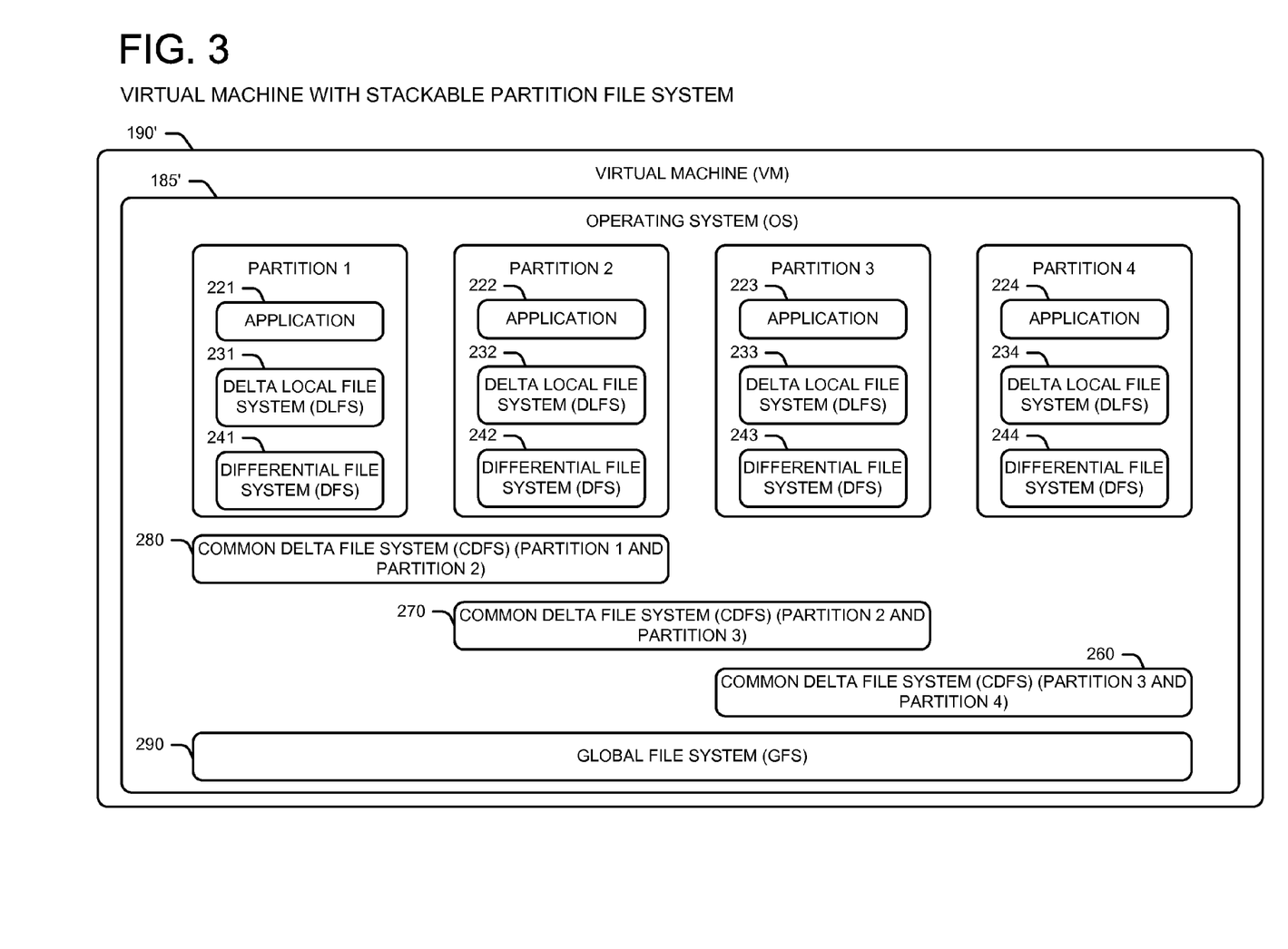
FIG. 3 shows a virtual machine with a stackable partition file system within an IHS that employs the disclosed partition file system management methodology.

FIG. 3 is a block diagram of another embodiment of virtual machine 190' that file system tool 180" populates with stackable partition file system information. Stackable partition file system information may provide improvements in memory resource management and utilization within VM 190' during application execution. When comparing the virtual machine of FIG. 2 and FIG. 3, like numbers indicate like elements. Partition 1 includes application 221, DLFS 231 and a differential file system (DFS) 241. For any particular partition, a differential file system (DFS) may include information that is unique or different from file system information within delta local files systems and common delta file systems. The information within DFS stores may replace information within the DLFS and CDFS stores with later or newer information. Partition 2 includes application 222, DLFS 232 and a DFS 242. Partition 3 includes application 223, DLFS 233 and a DFS 243. Partition 4 includes application 224, DLFS 234 and a DFS 244. OS 185' further includes GFS 290 in a similar manner to the VM 190' embodiment shown in FIG. 2. However, as shown in FIG. 3, OS 185' also includes stackable file systems, namely a CDFS 260, a CDFS 270 and a CDFS 280.

The common delta file systems (CDFSs) are shown as stacked on top of each other, this stackable formation denotes the ability of file system tool 180" to generate multiple common file systems that provide common information for multiple partitions of the virtual machine VM 190'. OS 185' employs a common resource area or memory resource area that includes the stackable CDFSs. A particular partition's local file system may include delta local file systems (DLFSs) and differential file systems (DFSs). For example, partition 1 includes delta local file system DLFS 231 and differential file system DFS 241.

During execution of applications, such as application 221 and application 222, file system tool 180" may generate common delta file systems, such as CDFS 250 described above in reference to FIG. 2. In a similar manner, file system tool 180" may generate CDFS 260 in response to application 223 and application 224 execution, within partition 3 and partition 4, respectively. CDFS 260 maintains common information that both application 223 and application 224 require. The information within CDFS 260 may not coincide with requirements of other applications of OS 185, namely application 221 and application 222, within partition 1 and partition 2, respectively.

In another similar operation, file system tool 180" may generate CDFS 270 in response to the information requirements of executing application 222 and application 223, within partition 2 and partition 3, respectively. As shown in FIG. 3, CDFS 270 may stack upon the previously generated CDFS 260 to provide more system information in response to application execution requests within OS 185'. File system tool 180" may generate CDFS 280 in response to information requirements of executing application 221 and application 222, within partition 1 and partition 2, respectively. In one embodiment, CDFS 280 replaces the previous CDFS 250 as described in FIG. 2 above with newer information specific to partition 1 and partition 2. Many other combinations of common delta file system organization are possible within other embodiments of the disclosed partition file system method.

In one embodiment, file system tool 180" may combine multiple CDFSs to form a merged CDFS (not shown). For example, file system tool 180" may combine CDFS 250 of FIG. 2 and CDFS 280 of FIG. 3 into a single new and merged common delta file system CDFS (not shown). In this manner, file system 180" may reduce the number of file systems within VM 190' without any loss of information for the executing applications of the partitions of OS 185'. In a manner similar to the embodiment of FIG. 2, delta local file systems, such as DLFS 231 include information that is unique to the local application, namely application 221 and not part of GFS 290. The embodiment, as shown in FIG. 3, includes such differential file systems. For example, partition 1 includes DFS 241. DFS 241 may include information that is different from the common delta file system (CDFS) information.

For example, CDFS 280 may contain 10 new entries (not shown) to telephone directory information within GFS 290. In this manner, both application 221 and application 222 have access to the entire telephone directory information within GFS 290 as well as the 10 new entries. In one embodiment, DFS 241 may remove one of the 10 entries and effectively convert CDFS 280 into a new 9 entry list. In a similar manner, DFS 242 may remove two of the 10 entries and effectively convert CDFS 280 into a new 8 entry list. Both application 221 and application 222 now have different information that they may retrieve from CDFS 280 without the need to modify CDFS 280 directly. In another embodiment, DLFS 231 and DLFS 232 maintain the differences between the information for partition 1 and partition 2 as that pertains to information updates to CDFS 280.

File system tool 180" may employ special logic to manage the most effective utilization of memory resources while balancing the amount of information between local file systems, common delta file systems and the global file system. For example, pertaining to partition 1, file system tool 180" balances information between DLFS 231, DFS 241, CDFS 280, and GFS 290. Each of these file systems contains information that may be pertinent to executing applications within partition 1, such as application 221.

Figure 4:
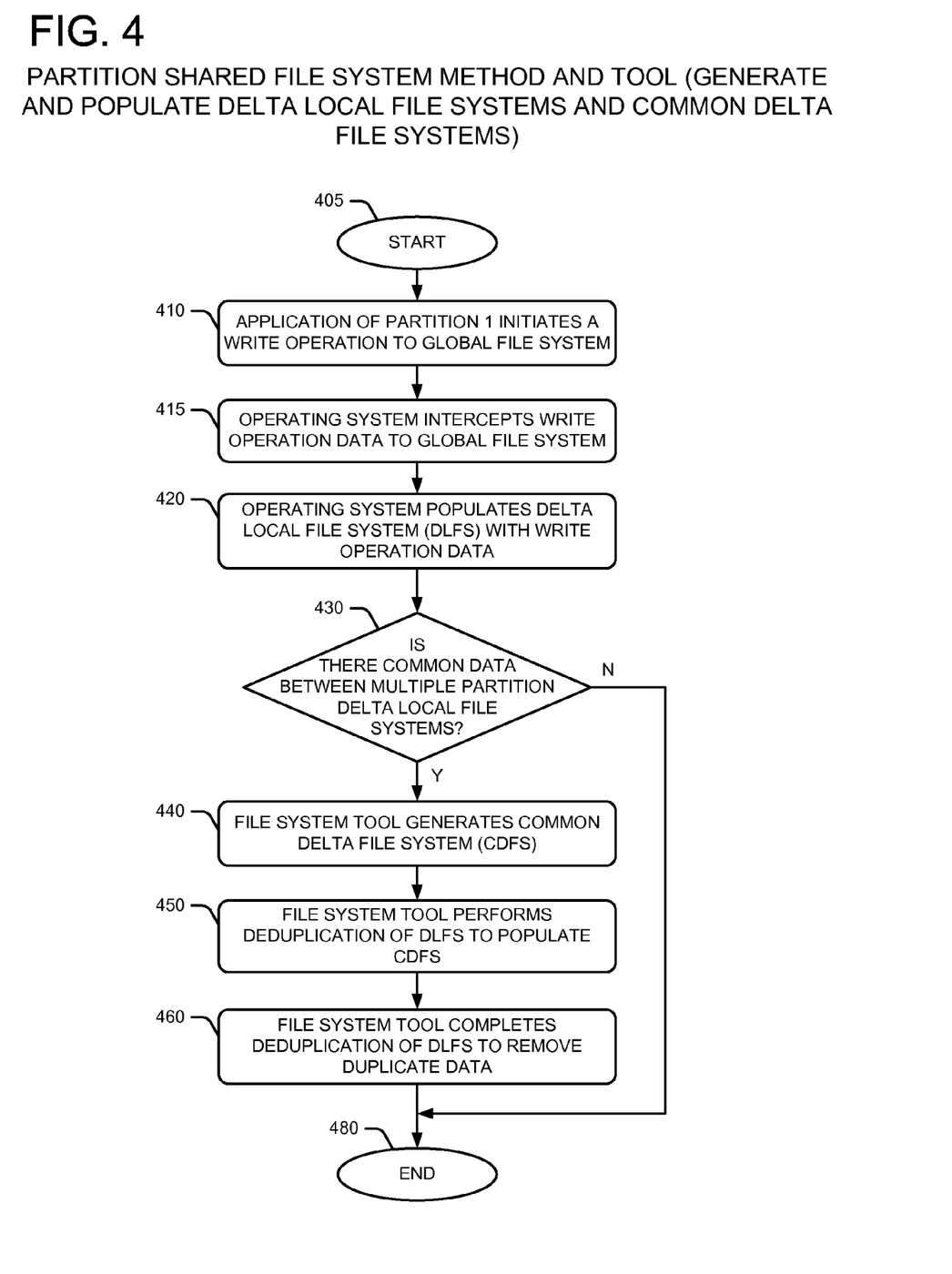
FIG. 4 depicts a flowchart of an embodiment of the disclosed partition file system management method that provides IHS virtual machine partition file system capability.

FIG. 4 is a flowchart that shows process flow in one embodiment of the disclosed partition file system management methodology that generates and populates delta local file systems (DLFSs) and common delta file systems (CDFSs) in an IHS. More specifically, the flowchart of FIG. 4 shows how the virtual machine (VM) 190' that file system tool 180" may employ provides application execution file system support within the file systems of OS 185'. In particular, FIG. 4 depicts the process flow for the VM 190' embodiment shown in FIG. 2.

The disclosed partition file system management method starts, as per block 405. In one example, application 221 of partition 1 initiates a write operation to global file system (GFS) 290, as per block 410. In this manner, application 221 may generate write operation data to store in GFS 290. OS 185' intercepts the write operation data to global file system (GFS) 290, as per block 415. In more detail, file system tool 180" intercepts the write operation data that application 221 directs to GFS 290. OS 185' may determine that this information resides within a local file system of partition 1. OS 185' populates DLFS 231 with write operation data, as per block 420. In one embodiment, OS 185' may first generate DLFS 231 if that file system does not currently exist before populating DLFS 231 with file system information.

In one embodiment of the disclosed partition file system method, OS 185' may employ a copy on write (COW) method to populate DLFS 231. COW may be a virtual machine optimization method that forms part of operating system OS 185'. If a particular application, such as application 221 attempts a write operation to GFS 290, OS 185' may intercept information of that attempted write operation and copy that information to a private or local file system within partition 1. In this example, OS 185' copies the write operation data to DLFS 231. In this method, application 221 may not be aware that the information is now within a local file system of partition 1. Application 221 may execute as though OS 185' updates GFS 290 with the write operation. By providing write operation data to DLFS 231, OS 185' may avoid the unnecessary duplication of GFS 290 within partition 1 for any particular write operations.

OS 185' performs a test to determine if there is common data between multiple partition delta local file systems, as per block 430. If such common data exists, file system tool 180" generates a common delta file system (CDFS), as per block 440. For example, OS 185' may determine that common data exists within DLFS 231 and DLFS 232 of partition 1 and partition 2, respectively. In this case, OS 185' generates a common delta file system, namely CDFS 250, for use by partition 1 and partition 2 collectively.

File system tool 180" performs deduplication of DLFS 231 and DLFS 232 to populate CDFS 280, as per block 450. In other words, file system tool 180" determines the common data that exists between DLFS 231 and DLFS 232 and moves that information to a new and common file system, namely CDFS 280. File system tool 180" completes deduplication of DLFS 231 and DLFS 232 to remove duplicate data, as per block 460. Deduplication is a data compression technique that OS 185' employs to eliminate or reduce redundant information within file system stores. OS 185' may employ deduplication methods to improve data storage utilization. In other words, the deduplication process first identifies common or duplicated data and then moves and deletes the duplicated data in the file system stores within OS 185', thus leaving one copy of the data remaining for usage by operating system 185'.

If the common data test shown in block 430 does not find common or duplicate data, or after the deduplication process completes at block 460, the disclosed partition file system management method ends, as per block 480. OS 185' may repeat the process steps as shown in FIG. 4 continuously, on demand, or on a periodic basis during application execution to provide improvements to file system memory resources of VM 190'. OS 185' may employ file system tool 180" to maintain an effective balance between memory utilization and information retrieval bandwidth between the multiple file systems of VM 190'.

Figure 5:
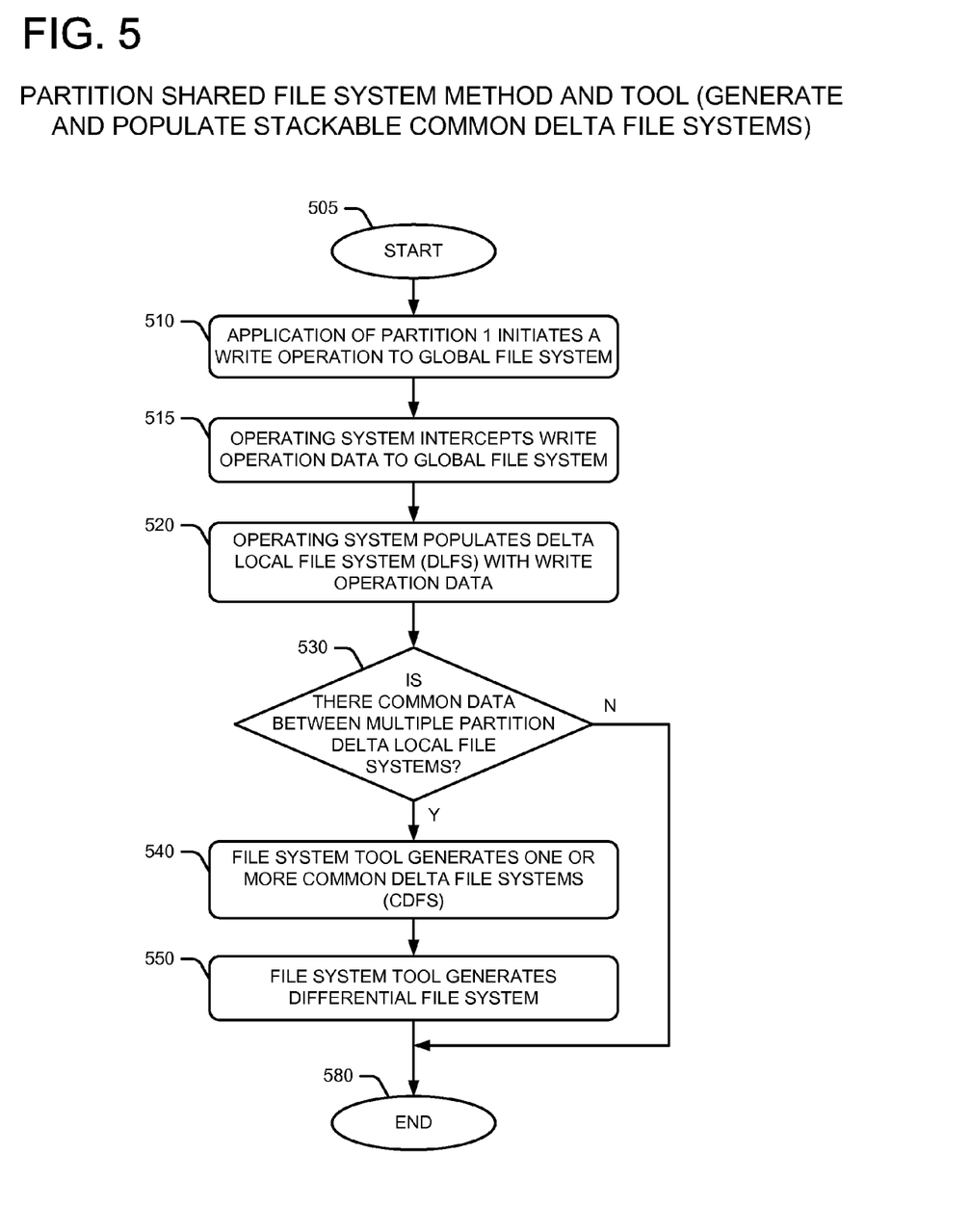
FIG. 5 shows a flowchart of another embodiment of the disclosed partition file system management method that provides IHS virtual machine stackable partition file system capability.

FIG. 5 is a flowchart that shows process flow in an embodiment of the disclosed partition file system management methodology that generates and populates stackable common delta file systems (CDFSs) in an IHS. More specifically, the flowchart of FIG. 5 shows how the virtual machine (VM) 190' that file system tool 180" may employ provides executing applications with file system support within the file systems of OS 185'. More particularly, FIG. 5 depicts the process flow for the VM 190' embodiment shown in FIG. 3.

The disclosed partition file system management method starts, as per block 505. In the disclosed method, application 221 of partition 1 initiates a write operation to global file system (GFS) 290, as per block 510. In this manner, application 221 may generate write operation data to store within GFS 290. OS 185' intercepts the write operation data to global file system (GFS) 290, as per block 515. In more detail, file system tool 180" intercepts the write operation data that application 221 directs to GFS 290. OS 185' populates DLFS 231 with write operation data from the intercepted write operation, as per block 520. In one embodiment, OS 185' may first create or generate DLFS 231 if that file system does not currently exist before populating with file system information.

As described in more detail above, OS 185' may employ a copy on write (COW) method to populate DLFS 231. OS 185' performs a test to determine if there is common data between multiple partition delta local file systems (DLFSs), as per block 530. If common data exists, file system tool 180" generates one or more common delta file systems (CDFSs), as per block 540. For example, OS 185' may determine that common data exists within DLFS 231 and DLFS 232 of partition 1 and partition 2, respectively. In this case, OS 185' generates a common file system, namely CDFS 250 for partition 1 and partition 2 collectively.

In another example, OS 185' may determine that common data exists within DLFS 232 and DLFS 233 of partition 2 and partition 3, respectively. In this case, OS 185' may generate a common file system, namely CDFS 270, as shown in FIG. 3 for partition 2 and partition 3 collectively. The generation of multiple common delta file systems provides for stackable file systems within OS 185'. In other words OS 185' may generate multiple file systems and stack those file systems in the memory resources of VM 190'. In order to provide an increase in file system efficiency and memory utilization within OS 185, file system tool 180" may generate differential file systems (DFSs).

Differential file systems, such as DFS 241 provide a method to keep track of differences between local file systems, such as DLFSs, and common file systems, such as CDFSs. For example, DFS 241 may include particular unique information that pertains only to partition 1 and is also part of CDFS 280. File system tool 180" may generate DFS 241 to provide partition 1 with that particular unique information and in that manner not require any modification or update to CDFS 280. File system tool 180" generates DFS 241, as per block 550. In a similar manner file system tool 180" may generate DFS 242, DFS 243, and DFS 244. File system tool 180" may perform trade-offs between the generation of differential file systems (DFSs), delta local file systems (DLFSs), common delta file systems (CDFSs) as well as global file systems (GFSs) to optimize or otherwise improve the file information utilization of VM 190'.

If the common data test as shown in block 530 does not find common or duplicate data, or after the differential file system (DFS) generation completes at block 550, the disclosed partition file system method ends, as per block 580. OS 185' may repeat the process steps as shown in FIG. 5 continuously, on demand, or on a periodic basis during application execution to improve memory utilization of file system memory space within VM 190'. OS 185' may employ file system tool 180" to maintain an effective balance between memory utilization and information retrieval bandwidth between the multiple file systems within VM 190'.

As will be appreciated by one skilled in the art, aspects of the disclosed partition file system management methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 4 and FIG. 5 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIG. 4 and FIG. 5 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIG. 4 and FIG. 5 described above.

The flowcharts of FIG. 4 and FIG. 5 illustrate the architecture, functionality, and operation of possible implementations of systems, methods and computer program products that perform network analysis in accordance with various embodiments of the present invention. In this regard, each block in the flowcharts of FIG. 4 and FIG. 5 may represent a module, segment, or portion of code, which comprises one or more executable instructions for implementing the specified logical function(s). It should also be noted that, in some alternative implementations, the functions noted in the block may occur out of the order noted in FIG. 4 and FIG. 5. For example, two blocks shown in succession may, in fact, be executed substantially concurrently, or the blocks may sometimes be executed in the reverse order, depending upon the functionality involved. It will also be noted that each block of FIG. 4 and FIG. 5 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An information handling system (IHS), comprising:
a processor;
a memory, coupled to the processor, the memory being configured to load an operating system, the operating system including a plurality of partitions including first and second partitions, the first and second partitions including first and second applications, respectively, the operating system including a global file system (GFS), and the GFS is populated with information common to all partitions of the plurality of partitions;
wherein the first application initiates a first write operation to the global file system (GFS), wherein the operating system intercepts the first write operation to the global file system (GFS), thus providing a first intercepted write operation that includes first intercepted write data, wherein the operating system generates a first delta local file system (DLFS) in the first partition to store the first intercepted write data, wherein a DLFS includes information that is unique to a particular partition of the plurality of partitions and is not part of any other file system in the operating system, wherein the first DLFS is stored in a memory location other than the GFS;
the memory including a file system tool that is configured to:
test to determine if the first intercepted write data is common between the first delta local file system (DLFS) in the first partition and a second delta local file system (DLFS) in the second partition, thus providing first common intercepted write data;
generate a first common delta file system (CDFS) that stores the first common intercepted write data that is common to the first and second partitions, wherein a CDFS includes information that is unique to the information of the GFS and is common between two or more partitions of the plurality of partitions, wherein the first CDFS is stored in a memory location other than the GFS and the first and second partitions; and
remove from the first delta local file system the first common intercepted write data;
generate a differential file system (DFS) wherein a DFS includes information that is different from a plurality of DLFSs and a plurality of CDFSs.

2. The IHS of claim 1, wherein the memory is configured such that the operating system generates a third partition, the memory being further configured such that the second application initiates a second write operation to the global file system, the memory also being configured such that the operating system intercepts the second write operation to the global file system, thus providing a second intercepted write operation that includes second intercepted write data, the memory further being configured such that the operating system generates a third delta local file system (DLFS) in the third partition to store the second intercepted write data, wherein the third DLFS is stored in a memory location other than the GFS, wherein the file system tool is further configured to:
test to determine if the second intercepted write data is common between the second delta local file system (DLFS) in the second partition and the third delta local file system (DLFS) in the third partition, thus providing second common intercepted write data;
generate a second common delta file system (CDFS) that stores the second common intercepted write data, that is common to the second and third partitions, wherein the second CDFS is stored in a memory location other than the GFS; and
remove from the second delta local file system (DLFS) the second common intercepted write data.

3. The IHS of claim 1 wherein the differential file system (DFS) includes information different from the first common delta file system (CDFS) and each of the first and second delta local file systems (DLFSs) of the first partition and the second partition, respectively.

4. The IHS of claim 2 wherein the file system tool is further configured to generate a merged common delta file system that combines the first and second common delta file systems for which the first and second write data are the same.

5. The IHS of claim 2 wherein the file system tool is further configured to stack the first and second common data file systems (CDFSs) in a common resource area in the system memory that stores the operating system.

6. The IHS of claim 2, wherein the operating system comprises a virtual machine.

7. The IHS of claim 3, wherein the differential file system (DFS) is stored in the first partition.

8. A computer program product, comprising:
a non-transitory computer readable storage medium for use on an information handling system (IHS);
first instructions that load an operating system into a system memory, the operating system including a plurality of partitions including first and second partitions, the first and second partitions including first and second applications, respectively, the operating system including a global file system, and the GFS is populated with information common to all partitions of the plurality of partitions;
second instructions that instruct the first application to initiate a first write operation to the global file system;
third instructions that instruct the operating system to intercept the first write operation to the global file system, thus providing a first intercepted write operation that includes first intercepted write data;
fourth instruction that instruct the operating system to generate a first delta local file system (DLFS) in the first partition to store the first intercepted write data, wherein the first DLFS is stored in a memory location other than the GFS, wherein a DLFS includes information that is unique to a particular partition of the plurality of partitions and is not part of any other file system in the operating system;
a file system tool that includes:
fifth instruction that test to determine if the first intercepted write data is common between the first delta local file system (DLFS) in the first partition and a second delta local file system (DLFS) in the second partition, thus providing first common intercepted write data;
sixth instructions that generate a first common delta file system (CDFS) that stores the first common intercepted write data that is common to the first and second partitions, wherein a CDFS includes information that is unique to the information of the GFS and is common between two or more partitions of the plurality of partitions, wherein the first CDFS is stored in a memory location other than the GFS and the first and second partitions; and
seventh instructions that remove from the first delta local file system (DLFS) the first common intercepted write data and;
eighth instructions that generate a differential file system (DFS) wherein a DFS includes information that is different from a plurality of DLFSs and a plurality of CDFSs;

wherein the first, second, third, fourth, fifth, sixth, seventh and eighth instructions are stored on the computer readable storage medium.

9. The computer program product of claim 8, comprising:
ninth instructions that generate a third partition;
tenth instructions that instruct the second application to initiate a second write operation to the global file system;
eleventh instructions that instruct the operating system to intercept the second write operation to the global file system, thus providing a second intercepted write operation that includes second intercepted write data;
twelfth instructions that instruct the operating system to generate a third delta local file system (DLFS) in the third partition to store the second intercepted write data, wherein the third DLFS is stored in a memory location other than the GFS;
wherein the file system tool further includes:
thirteenth instructions that test to determine if the second intercepted write data is common between the second delta local file system (DLFS) in the second partition and the third delta local file system (DLFS) in the third partition, thus providing second common intercepted write data;
fourteenth instructions that generate a second common delta file system (CDFS) that stores the second common intercepted write data that is common to the second and third partitions, wherein the second CDFS is stored in a memory location other than the GFS; and
fifteenth instructions that remove from the second delta local file system (DLFS) the second common intercepted write data.

10. The computer program product of claim 8, wherein the eighth instructions that instruct the operating system to generate the differential file system (DFS) includes information different from the first common delta file system (CDFS) and each of the first and second delta local file systems (DLFSs) of the first partition and the second partition, respectively.

11. The computer program product of claim 9, wherein the file system tool further comprises sixteenth instructions that generate a merged common delta file system that combines the first and second common delta file systems for which the first and second write data are the same.

12. The computer program product of claim 9 wherein the file system tool further comprises seventeenth instruction that stack the first and second common data file systems (CDFSs) in a common resource area in the system memory that stores the operating system.

13. The computer program product of claim 10, further comprising eighteenth instructions that store the differential file system (DFS) in the first partition.

14. The IHS of claim 1, wherein the operating system is implemented as a virtual machine in a gaming device and the GFS includes a telephone directory and the CDFS includes an entry to the telephone directory that is unique to the telephone directory of the GFS and common between two or more partitions of the plurality of partitions.

* * * * *